United States Patent
Ma et al.

(10) Patent No.: US 7,423,830 B2
(45) Date of Patent: Sep. 9, 2008

(54) DETECTING HEAD/DISK CONTACT IN A DISK DRIVE USING A CALIBRATION PARAMETER

(75) Inventors: Yiping Ma, Layton, UT (US); Mark Thayne, West Point, UT (US)

(73) Assignee: Iomega Corporation, San Diego, CA (US)

( * ) Notice: Subject to any disclaimer, the term of this patent is extended or adjusted under 35 U.S.C. 154(b) by 204 days.

(21) Appl. No.: 11/401,047

(22) Filed: Apr. 10, 2006

(65) Prior Publication Data

US 2007/0236821 A1    Oct. 11, 2007

(51) Int. Cl.
*G11B 21/21*    (2006.01)
(52) U.S. Cl. ....................................... 360/75
(58) Field of Classification Search ........................ None
See application file for complete search history.

(56) References Cited

U.S. PATENT DOCUMENTS

| | | | | |
|---|---|---|---|---|
| 5,991,113 | A * | 11/1999 | Meyer et al. ................... | 360/75 |
| 6,980,383 | B2 * | 12/2005 | Brunnett et al. ................ | 360/31 |
| 7,027,251 | B1 * | 4/2006 | Darragh et al. ................. | 360/75 |
| 7,158,325 | B1 * | 1/2007 | Hu et al. ........................ | 360/69 |
| 7,180,692 | B1 * | 2/2007 | Che et al. ...................... | 360/75 |
| 7,215,495 | B1 * | 5/2007 | Che et al. ...................... | 360/31 |
| 7,224,548 | B1 * | 5/2007 | Emo .......................... | 360/78.04 |
| 7,230,780 | B2 * | 6/2007 | Suk ............................... | 360/31 |
| 7,239,470 | B2 * | 7/2007 | Takahashi et al. .............. | 360/75 |
| 7,239,471 | B2 * | 7/2007 | Tanabe .......................... | 360/75 |
| 7,286,315 | B2 * | 10/2007 | Ryu .............................. | 360/75 |
| 7,292,401 | B2 * | 11/2007 | Shen et al. ..................... | 360/69 |
| 2005/0094316 | A1 * | 5/2005 | Shiramatsu et al. ...... | 360/234.5 |
| 2006/0007594 | A1 * | 1/2006 | Umehara et al. ............. | 360/128 |
| 2006/0119974 | A1 * | 6/2006 | Yamazaki et al. ............. | 360/75 |
| 2006/0139789 | A1 * | 6/2006 | Yang ............................ | 360/75 |
| 2006/0285248 | A1 * | 12/2006 | Pust et al. .................... | 360/128 |
| 2007/0035881 | A1 * | 2/2007 | Burbank et al. ........... | 360/234.3 |
| 2007/0103808 | A1 * | 5/2007 | Kiyono et al. ................ | 360/75 |
| 2007/0127147 | A1 * | 6/2007 | Yokohata et al. ............. | 360/75 |
| 2007/0133118 | A1 * | 6/2007 | Kajitani ....................... | 360/75 |
| 2007/0171563 | A1 * | 7/2007 | Pit ............................... | 360/75 |
| 2007/0195449 | A1 * | 8/2007 | Feist et al. .................... | 360/75 |
| 2007/0230018 | A1 * | 10/2007 | Schreck et al. ................ | 360/75 |

\* cited by examiner

*Primary Examiner*—Hoa T. Nguyen
*Assistant Examiner*—James L Habermehl
(74) *Attorney, Agent, or Firm*—Stephen C. Beuerle; Procopio Cory Hargreaves & Savitch LLP

(57) ABSTRACT

A disk drive having a heater element on the read/write head includes control circuitry to prevent head/disk contact by limiting power to the heater element. As the power to the heater element increases, thermal expansion reduces the fly height until head/disk contact occurs. During drive calibration, a maximum power level allowed to the heater element is determined by detecting heater power at a level where a parameter value such as motor current exceeds a threshold level.

9 Claims, 3 Drawing Sheets

DETECTING HEAD/DISK CONTACT IN A DISK DRIVE USING A CALIBRATION PARAMETER

TECHNICAL FIELD

This invention relates to computer storage products, and more particularly to detecting head disk contact during calibration of disk drives.

BACKGROUND

A disk drive is a data storage device that stores data in concentric tracks on a disk. Data is written to or read from the disk by spinning the disk about a central axis while positioning a transducer near a target track of the disk. During a read operation, data is transferred from the target track to an attached host through the transducer. During a write operation, data is transferred in the opposite direction.

During typical disk drive operation, the transducer does not contact the surface of the disk. Instead, the transducer rides along a cushion of air generated by the motion of the disk. The transducer is normally mounted within a slider structure that provides the necessary lift in response to the air currents generated by the disk. The distance between the transducer/slider and the disk surface during disk drive operation is known as the "fly height" of the transducer.

Because the transducer is held aloft during disk drive operation, friction and wear problems associated with contact between the transducer and the disk surface are usually avoided. However, due to the extremely close spacing of the heads and disk surface, minor variations in the read-write heads or disk platters can lead to a head crash—a failure of the disk in which the head scrapes across the platter surface, often grinding away the thin magnetic film. For giant magnetoresistive head technologies (GMR heads) in particular, a minor head contact (that does not remove the magnetic surface of the disk) could still result in the head temporarily overheating, due to friction with the disk surface, and renders the disk unreadable until the head temperature stabilizes.

The detection of the exact point of head disk contact is critical in disk drives since such contact could also lead to permanent damage to the recording head and/or the disk media. It is even more so for newer recording heads with the Dynamic Fly Height (DFH) technology. Such a recording head has an embedded heater in close proximity to the recording element. Localized thermal expansion when the heater is powered allows the fly height of the transducer be adjusted, thus achieving higher recording density. In order to properly calibrate the drive and heater, head/disk contact is needed at least once. It may also be desirable to recalibrated the drive at specified intervals during disk usage.

What is needed is a system to detect head disk contact upon initial calibration or re-calibration of the disk drive and the parameters that cause such contact. Once these parameters are determined, they can be monitored during disk operation to ensure any subsequent head disk contact does not occur.

SUMMARY

A disk drive having a heater element on the read/write head includes control circuitry to prevent head/disk contact by limiting power to the heater element. As the power to the heater element increases, thermal expansion reduces the fly height until head/disk contact occurs. During drive calibration, a maximum power level allowed to the heater element is determined by detecting heater power at a level where a parameter value such as motor current exceeds a threshold level.

DESCRIPTION OF DRAWINGS

These and other features and advantages of the invention will become more apparent upon reading the following detailed description and upon reference to the accompanying drawings.

DETAILED DESCRIPTION

Figure 1:
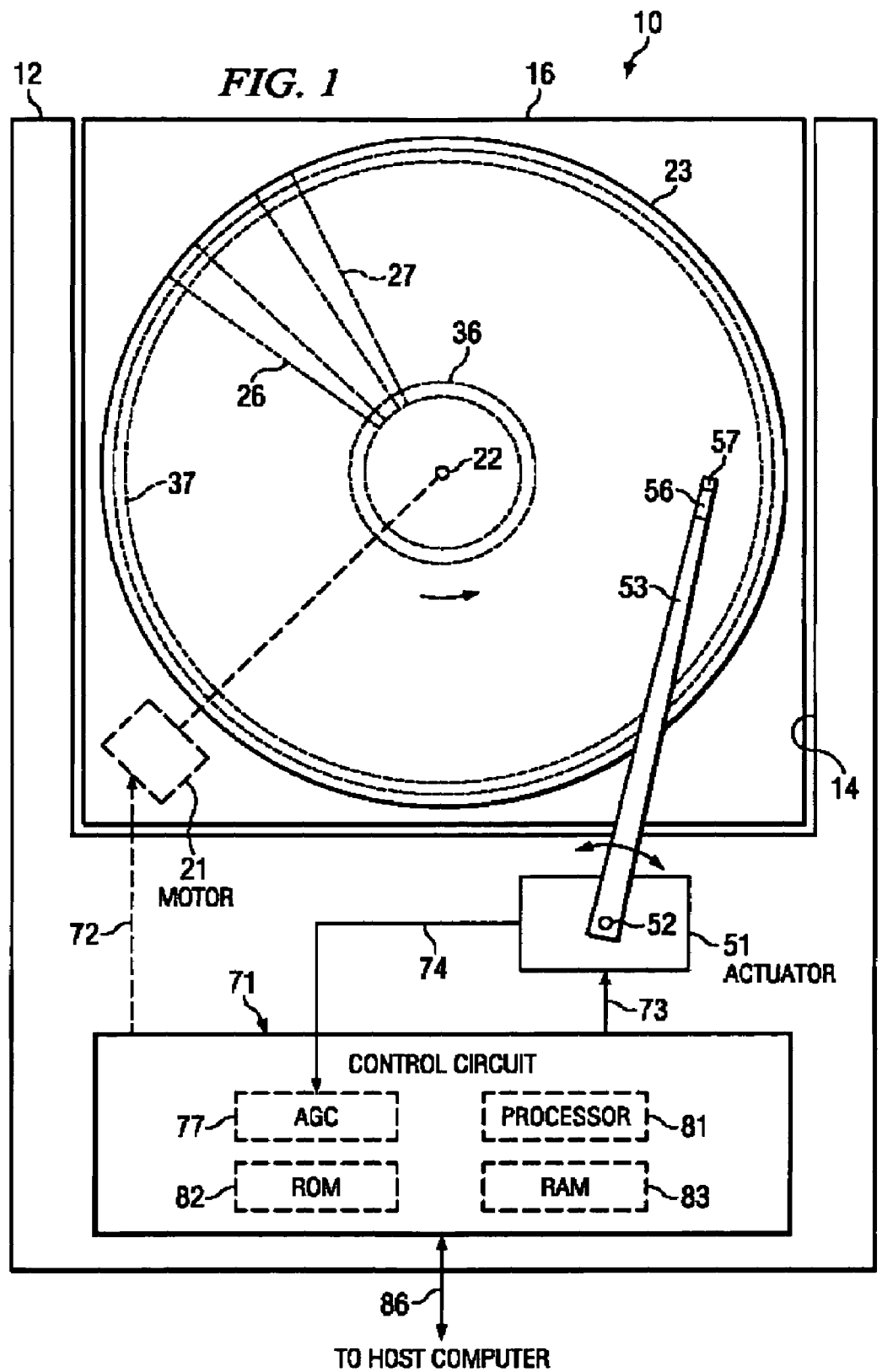
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 85,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 130,000 servo tracks. The servo tracks effectively define the positions of the data tracks, in a manner known in the art.

Data tracks are arranged in a concentric manner ranging from the radially innermost tracks 36 to the radially outermost tracks 37. User data is stored in the many data tracks that are disposed from the innermost tracks 36 to the outermost tracks 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a tunneling magneto-resistive (TMR) head. However, it could alternatively be some other type of head, such as a giant magneto-resistive (GMR) head. The head 57 includes a heater element proximate the recording element. As current is passed through the heater element, localized thermal expansion causes the head to expand.

During normal operation, the head 57 is disposed adjacent the magnetic surface on the disk 23, and pivotal movement of the arm 53 causes the head 57 to move approximately radially with respect to the disk 23, within a range which includes the innermost tracks 36 and the outermost tracks 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. As stated above, the distance the head floats above the disk is known as the "fly-height."

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

Disk drives having a high recording density use dynamic fly height technology to increase recording sensitivity. Because the recording transducer is not at the very trailing edge of the slider by design, to reduce the head media spacing, it would be necessary to reduce the overall fly height of the slider or the pitch angle of the flying head. Both of them could lead to head crash or media damages. Dynamic fly height technology produces the needed head media spacing reduction without affecting the overall slider flying characteristics by protruding only a small area around the recording transducers. Extensive head/disk contact should be prevented, particularly since the contact area is now around the transducers.

Figure 2:
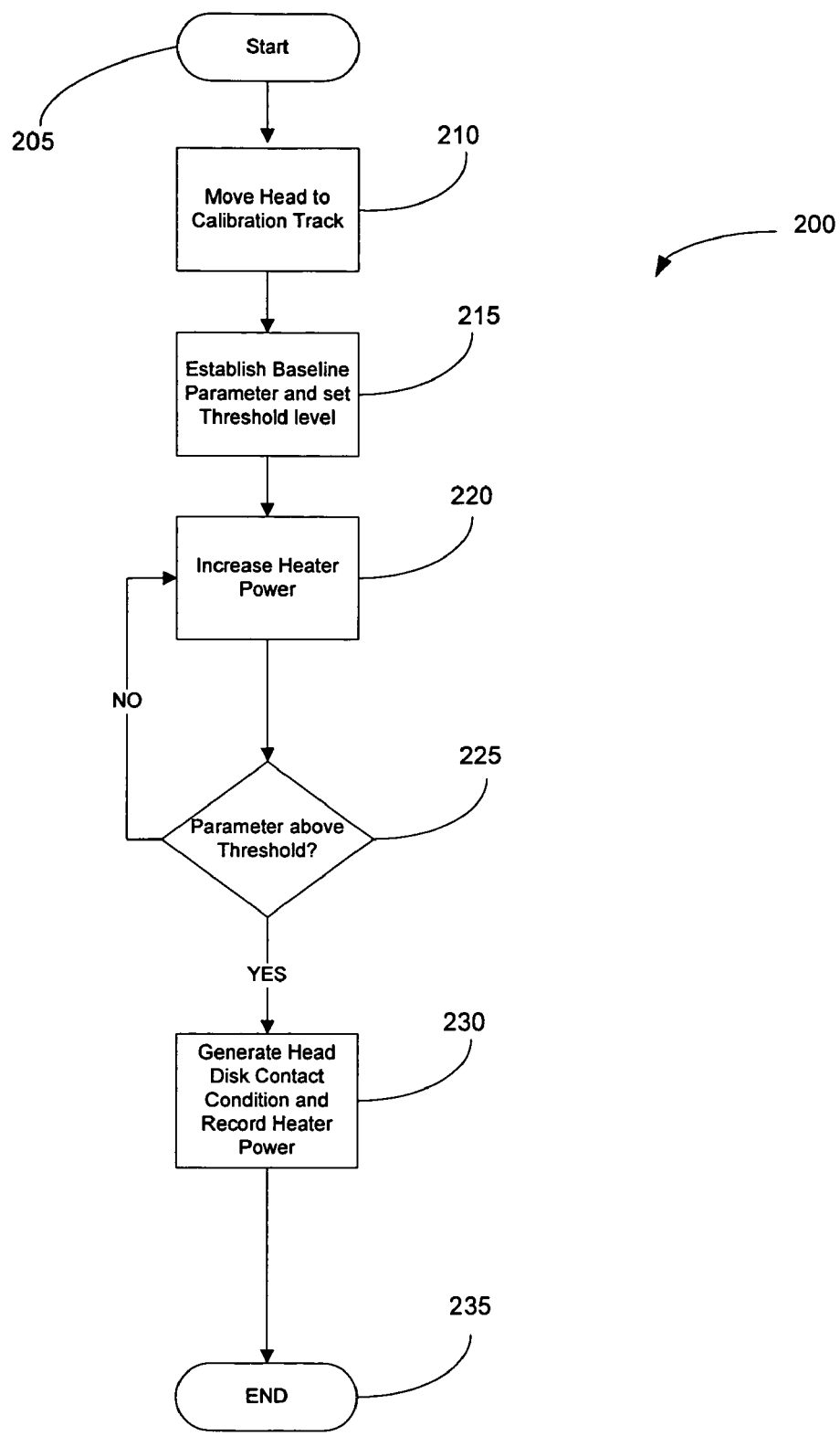
FIG. 2 is a flowchart illustrating a process for establishing a maximum heater power level to prevent head/disk contact.

FIG. 2 is a flowchart showing a process 200 for detecting the head disk contact point in the present invention using a baseline parameter. The process 200 may be performed upon initial calibration of the disk drive and may also be performed to re-calibrate the disk drive at a specified interval. The re-calibration interval may be determined by a variety of factors, including but not limited to time since initial calibration, amount of use of the drive, new cartridges being inserted into the drive, or triggered by a parameter value. The process 200 begins at a START block 205. Proceeding to block 210, the process 200 moves the head proximate a calibration track of the disk. The calibration track may be a special area of the disk where no data is to be stored or just may be a predefined track on the disk at a specific radii.

Proceeding to block 215, the process 200 measures and establishes a baseline parameter and sets the threshold level. The parameter is a measurement that can be used to detect head/disk contact. Some parameters that are effective at determining head/disk contact are motor current or position error signal (PES). For example, any change in head disk friction will change the head drag exerted on the disk. As a result, the driving current to the spindle motor has to be adjusted to maintain the proper spindle rotation speed. Thus, when head/disk contact occurs, the motor current spikes. A similar dramatic change in PES also indicates head/disk contact. The baseline parameter value may be set to a level approximately equal to the measured level. The threshold level is then set to an appropriate value based on the baseline value.

Proceeding to block 220, the process 200 slowly increases the heater power. As heater power is increased, the fly height near the transducer area will decrease due to localized thermal expansion. The fly height will decrease until it reaches zero, the point of head/disk contact.

Proceeding to block 225, the process monitors the parameter value to determine if the value is above the threshold value. If the parameter value is below the threshold value, no head/disk contact has yet occurred and the process 200 proceeds along the NO branch back to block 220 where the heater power is incrementally increased. Once the heater power reaches a level where head/disk contact occurs, the parameter value will peak above the threshold level and the process 200 proceeds along the YES branch to block 230.

In block 230, the process 200 generates the head/disk contact condition as necessary and records the value of the heater power setting. This heater power setting may then be used to generate a hard stop condition so the heater power is not raised to such a level during drive operation. This will ensure that the localized thermal expansion caused by the heater power level does not cause a head/disk contact during drive operation. After the heater power setting is recorded, the process terminates in END block 235.

Figure 3:
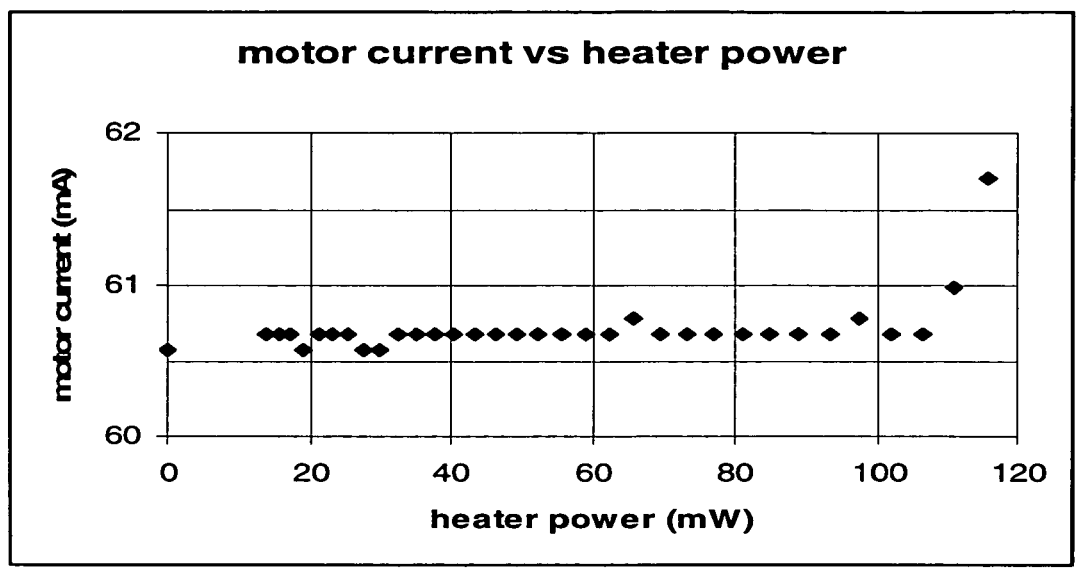
FIG. 3 is a graph which illustrates the typical output of motor current vs. heater power during a calibration process according to one embodiment of the present invention.

FIG. 3 illustrates the typical output of motor current vs. heater power during a calibration process according to one embodiment of the present invention where motor current is used as the measured parameter. Each data point represents incremental heater registry value on the pre-amp chip. The motor current remains almost constant until the protruded area on head touches the disk surface. The motor current then increases drastically due to the change in the mode of friction between the head and disk. Contact detection was triggered at about 116 mW, only one registry value beyond the actual first contact. Typical repeatability of this particular motor current measurement in the absence of contact has a standard deviation of 0.1 mA. In this case the contact threshold may be set at a value of 1 mA (10 times the repeatability of the measurement).

Once the contact is detected, the heater power at first contact can then be determined as the knee of the curve (about 106 mW in this particular case). In subsequent field usage, this heater power limit can then be used to prevent head/disk contact.

In an alternative embodiment, the heater power level that generates the hard stop may be adjusted due to external environmental factors. Many disk drives now contain sensors to detect environmental conditions such as temperature, elevation and humidity. Because thermal expansion may be affected by such environmental conditions, the control circuit 71 may include compensation formulas to detect environmental conditions and vary the limit of the heater power level accordingly. Such compensation formulas are well known in the art and will not be described herein.

Numerous variations and modifications of the invention will become readily apparent to those skilled in the art. Accordingly, the invention may be embodied in other specific forms without departing from its spirit or essential characteristics.

What is claimed is:

1. A method for detecting head/disk contact in a disk drive having a head with a heater element including a heater power and a heat power level, and a motor for driving the disk drive, the disk drive having a motor current value, comprising: establishing a motor current threshold level; increasing heater power; comparing a motor current value to the motor current threshold level; and recording a contact heater power level when the motor current value exceeds the motor current threshold level.

2. The method of claim 1, further comprising generating a head/disk contact condition when the motor current value exceeds the motor current threshold level.

3. The method of claim 1, further comprising positioning the head above a calibration track prior to increasing the heater power.

4. The method of claim 1, further comprising identifying first contact point after detecting head/disk contact.

5. The method of claim 1, further comprising performing disk drive calibration and storing the contact heater power level during disk drive calibration.

6. The method of claim 1, further comprising modifying the contact heater power level based upon environmental factors.

7. A disk drive having a motor for driving the disk drive, the disk drive having a motor current value and a motor current threshold level, comprising: a head having a heater element; a data storage disk; and control circuitry which prevents head/disk contact by limiting power to the heater element to a maximum value determined during drive calibration by detecting heater power at a level where the motor current value exceeds the motor current threshold level.

8. The disk drive of claim 7, wherein the maximum value is determined using a calibration track of the data storage disk.

9. The disk drive of claim 7, wherein the control circuitry adjusts the maximum value of the power to the heater element based on environmental factors.

* * * * *